March 17, 1931.   P. F. SHIVERS   1,796,544
DIAPHRAGM CONTROLLED GAS VALVE HEATING SYSTEM
Filed Dec. 23, 1929   2 Sheets-Sheet 1
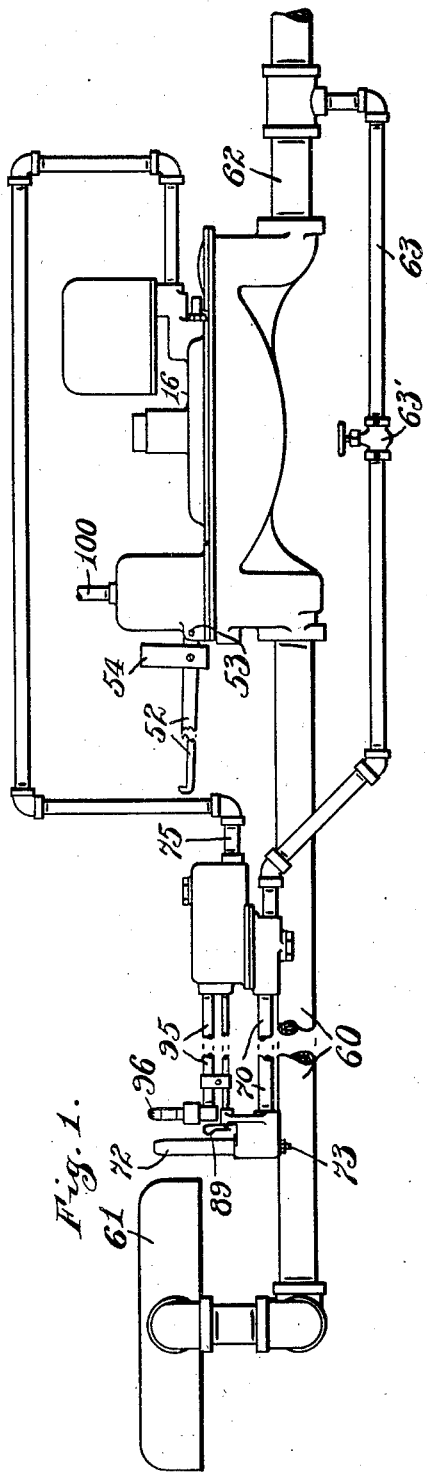
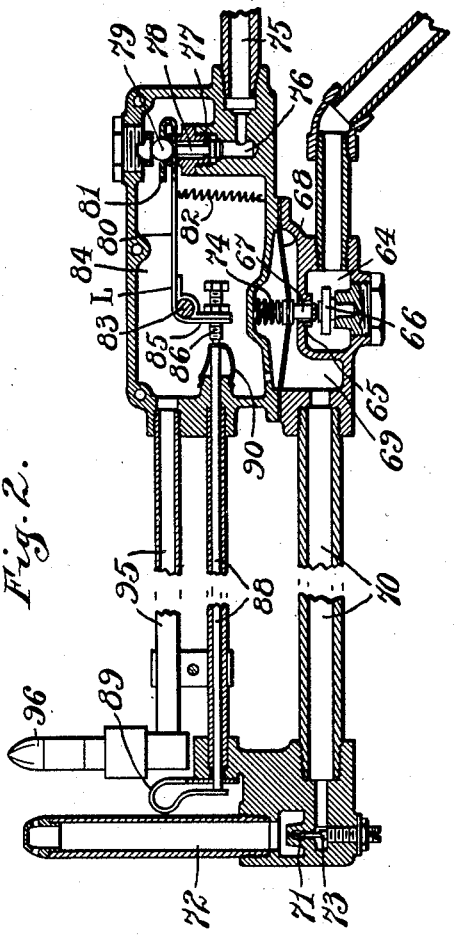
INVENTOR.
Paul F. Shivers,
BY
Hood + Hahn
ATTORNEYS Patented Mar. 17, 1931

1,796,544

UNITED STATES PATENT OFFICE

PAUL F. SHIVERS, OF WABASH, INDIANA, ASSIGNOR TO MINNEAPOLIS HONEYWELL REGULATOR COMPANY, OF WABASH, INDIANA, A CORPORATION OF DELAWARE

DIAPHRAGM-CONTROLLED GAS-VALVE HEATING SYSTEM

Application filed December 23, 1929. Serial No. 415,985.

The object of my invention is to provide simple and efficient mechanism for controlling the flow of fluid fuel, generally fuel gas, to the burner of a heating plant, such for instance as a steam or hot water heating plant, in accordance with the condition of and need for the heating medium in the heating plant.

The accompanying drawings illustrate an embodiment of my invention, particularly designed for the use and control of fuel gas.

Fig. 1 is a side elevation of the apparatus;

Fig. 2 is an enlarged vertical sectional detail of the pilot light and adjacent parts;

Figure 3:
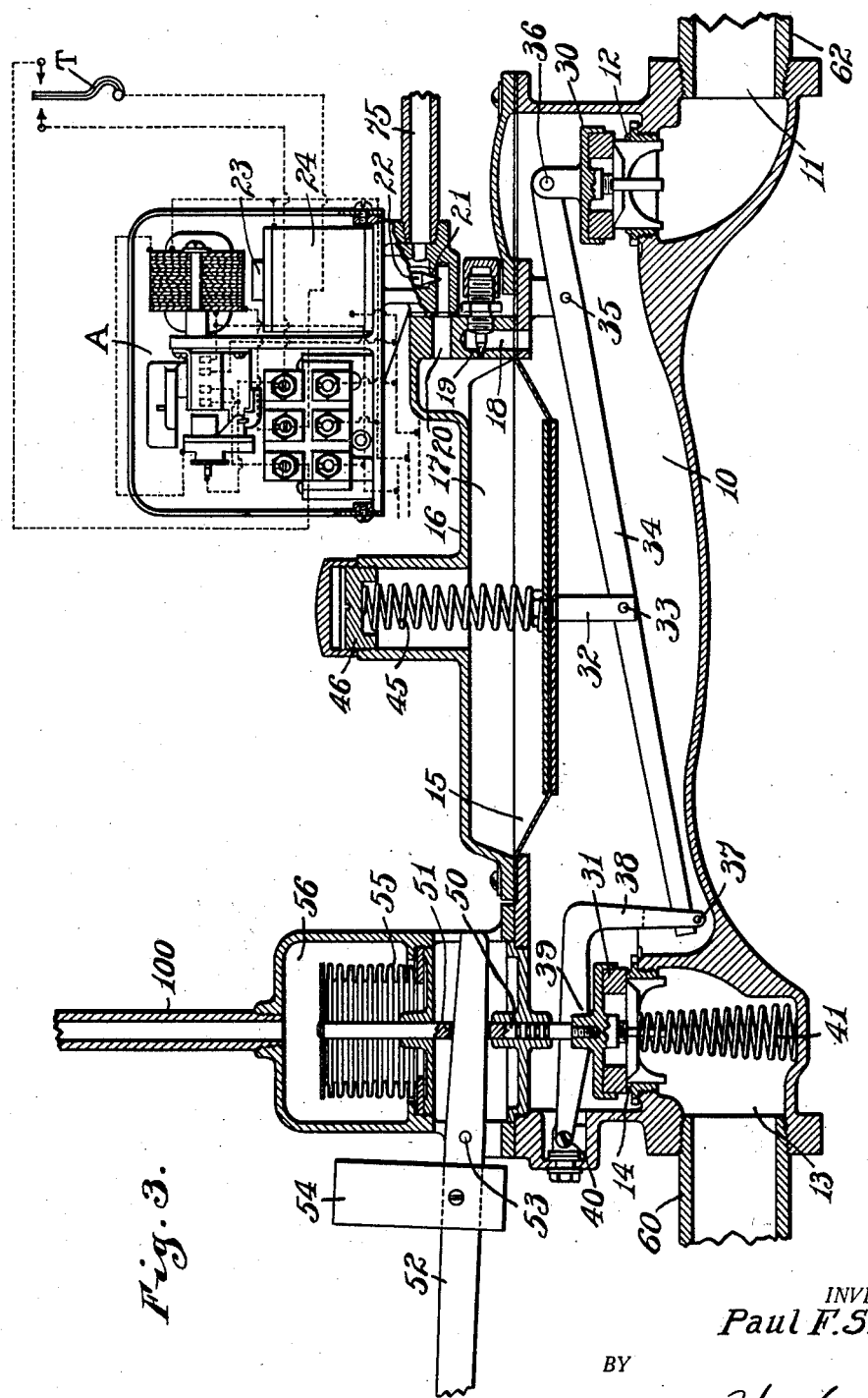

Fig. 3 an enlarged vertical sectional detail of the primary gas flow controlling mechanism.

In the drawings 10 indicates a valve chamber having an inlet passage 11, an inlet valve seat 12, an outlet passage 13 and an outlet valve seat 14. A portion of one wall of chamber 10 is formed by a flexible diaphragm 15 covered by a cap 16 to form a pressure-retaining chamber 17. The passage 18 forms a communication between chambers 10 and 17 and flow through this passage is controlled by a manually adjustable needle valve 19 so that fluid from chamber 10 may bleed into chamber 17 at a desired controllable slow rate. Leading from chamber 17 is a passage 20 having an outlet valve seat 21 in which is seated a needle valve 22 carried by the core 23 of a solenoid coil 24. Energization of coil 24 is determined by a relay A of any well-known form, controlled in a well-known manner from a distant point by a room thermostat T or other well-known temperature-affected element in the region the temperature of which is to be affected by the heating medium.

Arranged to seat upon seat 12 is an inlet valve 30 and arranged to seat upon seat 14 is an outlet valve 31, both of said valves being arranged within chamber 10. Secured to diaphragm 15 is a stem 32 connected at 33 with a lever 34 arranged within chamber 10 and fulcrumed at 35, said lever being connected at 36 with valve 30 and acting at 37 upon a lever 38 which acts in closing direction only, at 39, upon valve 31, said lever 38 being fulcrumed at 40. Valve 31 is normally biased in the opening direction by a spring 41. Diaphragm 15 is biased, in a direction to open valve 30 and close valve 31, by any suitable means, such for instance as spring 45 provided with an adjustable abutment 46.

Secured to valve 31 is a stem 50 which is projected through a wall of chamber 10 in a gas-tight manner, and outside of chamber 10 this stem is slotted at 51 to receive one end of a lever 52 pivoted at 53 and carrying at its opposite end an adjustable counterweight 54, said weight acting normally to open valve 31. Associated with the outer end of stem 50 is a fluid-tight packing bellows or diaphragm 55 arranged within a pressure-retaining chamber 56, the arrangement being such that pressure within said chamber upon bellows 55 will counteract weight 54. Connected with the outlet passage 13 is a pipe 60 which leads to a burner 61, and leading into inlet 11 is a fuel supply pipe 62. Leading from pipe 62 is a pilot supply pipe 63 which leads into a valve chamber 64 having an outlet passage 65 controlled by a valve 66 which is carried by stem 67 carried by a diaphragm 68 forming part of the wall of the chamber 69 connected by a passage 70 with a needle valve seat 71 leading to a pilot burner 72, said seat 71 being provided with a manually adjustable needle valve 73. In pipe 63 is a valve 63'. Valve 66 is biased to open position by a spring 74 acting upon diaphragm 68 against the pressure within chamber 69. Leading from the discharge side of seat 21 is a pipe 75 which leads into a passage 76 having a valve seat 77. Cooperating with seat 77 is a thermostatically-controlled valve 78, the upper end of the stem of which carries a head 79 which is arranged between the arm 80 of a lever L and a backwardly bent portion 81 of said lever, said portion 81 acting downwardly on head 78 while the main body of the arm 80 may act upwardly upon said head. Arm 80 of lever L is biased downwardly by a spring 82. Lever L is pivoted at 83 within a chamber 84 and its other arm 85 carries a temper screw 86 which is engaged by the inner end of the rod 88, the opposite end of which is engaged by a thermostatic element 89 arranged adjacent the pilot burner 72 in position to be affected by the heat thereof. External leakage around rod 88 is prevented by a flexible diaphragm or packing cup 90 secured to said rod and an adjacent portion of the wall of chamber 84.

Leading from chamber 84 is a waste pipe 95 which delivers to a burner tip 96 arranged closely adjacent the tip of the pilot burner 72 in such position that any gas issuing from tip 96 will be ignited by the flame issuing from the pilot burner 72.

A pipe 100 communicates with chamber 56 and is connected at its other end to the hot water or steam boiler (not shown), the arrangement being such that bellows 55 may be responsive to pressure or temperature conditions in the boiler. It will be readily understood that, in a well-known manner, the outer end of pipe 100 might be closed and chamber 56 and pipe 100 might be filled with a readily expansible fluid such as $SO_2$, and the outer end laid closely adjacent the boiler in such manner that variations in temperature conditions of the boiler will affect bellows 55 to determine the position of valve 31 under the biasing action of spring 41.

The operation is as follows:

When there is no call for heat valve 22 is closed and the accumulation of pressure in chamber 17 through bleed passage 18 balances the pressure within chamber 10 so that spring 45 operates to fully open valve 30 and close valve 31.

Upon opening valve 63' and lighting the pilot burner 72 thermostat 89 will heat up so as to raise valve 78 from its seat 77, thus putting chamber 84 into communication with pipe 75. Upon a call for heat, relay A will be energized, by action of the room thermostat, to energize coil 24 to lift valve 22 from its seat, thus venting chamber 17 into chamber 84 and thence to the waste burner 96, the escaping waste gas being ignited by the flame from the pilot burner 72. The release of pressure within chamber 17 permits diaphragm 15 to move upwardly thus moving valve 30 toward its seat 12 to throttle the gas supply, and releasing valve 31 to permit gas to flow to the main burner 61. Because of the differing leverages of connections valve 31 will be wide open (and against stop 31') before valve 30 has been moved very far in its closing direction and valve 30 is thereafter utilized to variably throttle communication between the supply pipe 62 and chamber 10 to maintain a uniform pressure in said chamber so long as valve 31 is unseated, such regulation being determined by the strength of spring 45 and the difference of pressures in chambers 10 and 17 as determined by the rate of flow into chamber 17 through bleed passage 18 and outflow from said chamber through passages 20 and 75. A uniform supply pressure for the main burner is thus insured and, during the normal operation of the main burner, so long as there is a call for heat, there will be a small quantity of gas continuously escaping from chamber 10 through passage 18, chamber 17, passages 20, 75, 76, chamber 84, passage 95 and waste burner 96.

Upon a cessation of demand for heat, relay A acts to deenergize coil 24 and permit valve 22 to return to its seat 21, thus permitting an accumulation of pressure within chamber 17 so that diaphragm 15 will act upon lever 34 to move lever 38 downwardly and close valve 31 so as to shut off the supply of gas to burner 61. If the pilot light should be accidentally extinguished, thermostat 89 will cool down so as to permit spring 82 to close valve 78 so that, even though valve 22 be held open by coil 24, due to a continued demand for heat, there will be an accumulation of pressure within chamber 17 which will permit spring 45, acting upon lever 34, to close valve 31 and thus discontinue the supply of fuel to burner 61.

Whenever the temperature or pressure in the boiler reaches a desired maximum sufficient to exert a pressure upon bellows 55 great enough to overcome counter weight 54, stem 50 will be urged downwardly, thus carying valve 31 downwardly away from lever 38 and against the action of spring 41, so as to gradually shut off the supply of fuel to burner 61, even though a continued demand for heat is acting to hold valve 22 open.

It will be noticed that the diaphragm 15 performs the double function of regulating the pressure of gas supplied to the burner to a predetermined maximum, irrespective of the supply of gas at a greater pressure to the apparatus and also shutting off the supply of gas to the burner in the absence of demand for heat or any accidental clogging of the communication between chamber 17 and waste burner 62.

It will also be noted that, because of the one-way connection between lever 38 and valve 31, valve 31 may be actuated in a closing direction by the element 55 independent of the action of valve 22.

Diaphragm 68 and valve 66 serve to limit the supply of gas to the pilot burner 72 to a predetermined maximum independent of burner 61, so that a uniform flow of gas to the pilot burner is assured. This is important in maintaining a constant pilot light and eliminates any possibility of extinction of the pilot light due to sudden fluctuations of pressure in the chamber 10, the main burner 61, or the connecting passages between chamber 10 and said burner 61.

If there should be a call for heat, and a consequent opening of valve 22, in the absence of the pilot light, and the consequent cold position of the thermostatic element 89, valve 78, remaining seated, will prevent a sufficient venting of chamber 17 to permit valve 31 to open and consequently there will be no delivery of gas to burner 61.

I claim as my invention:

1. Fluid-fuel control apparatus comprising a chamber having an inlet and outlet, and having a diaphragm wall portion, an inlet valve, an outlet valve, operative connections between the diaphragm and the inlet valve, connections between the diaphragm and the outlet valve acting in valve-closing direction, yielding means biasing the outlet valve in opening direction, means biasing the diaphragm in inlet-valve opening direction, a pressure-retaining chamber associated with the outer face of the diaphragm and having a restricted communication with the first-mentioned chamber, a valve for controlling outflow from the last-mentioned chamber, and means for automatically opening and closing said last-mentioned valve.

2. Apparatus of the character specified in claim 1 embodying means independent of the diaphragm for moving the outlet valve to closed position, and wherein the connection between the diaphragm and the outlet valve acts upon the outlet valve in closing direction only.

3. In combination with apparatus of the character specified in claim 1, means for maintaining a constant pilot light independent of conditions within the first-mentioned chamber, a main burner supplied from the outlet of the first-mentioned chamber, a second normally-closed valve arranged to control outflow from the pressure-retaining chamber beyond the first-mentioned valve controlling said outflow, and thermostatic means within the heat influence of the pilot burner for controlling said last-mentioned valve.

4. In combination with apparatus of the character specified in claim 1, means for maintaining a constant pilot light independent of conditions within the first-mentioned chamber, said means embodying a pressure regulator, a main burner supplied from the outlet of the first-mentioned chamber, a second normally-closed valve arranged to control outflow from the pressure-retaining chamber beyond the first-mentioned valve controlling said outflow, and thermostatic means within the heat influence of the pilot burner for controlling said last-mentioned valve.

5. In combination with apparatus of the character specified in claim 1 and wherein the connection between the diaphragm and outlet valve acts upon the outlet valve in closing direction only, means for maintaining a constant pilot light independent of conditions within the first-mentioned chamber, a main burner supplied from the outlet of the first-mentioned chamber, a second normally-closed valve arranged to control outflow from the pressure-retaining chamber beyond the first-mentioned valve controlling said outflow, thermostatic means within the heat influence of the pilot burner for controlling said last-mentioned valve, and means independent of the diaphragm, for acting upon the outlet valve in a closing direction.

6. In combination with apparatus of the character specified in claim 1 and wherein the connection between the diaphragm and outlet valve acts upon the outlet valve in closing direction only, means for maintaining a constant pilot light independent of conditions within the first-mentioned chamber, said means embodying a pressure regulator, a main burner supplied from the outlet of the first-mentioned chamber, a second normally-closed valve arranged to control outflow from the pressure-retaining chamber beyond the first-mentioned valve controlling said outflow, thermostatic means within the heat influence of the pilot burner for controlling said last-mentioned valve, and means independent of the diaphragm for acting upon the outlet valve in a closing direction.

7. Fluid-fuel control apparatus comprising a chamber having an inlet and an outlet and having a diaphragm wall portion, an inlet valve, an outlet valve, means controlled by the diaphragm for simultaneously actuating the two valves in opposite directions, means biasing the diaphragm in inlet-valve opening direction, a pressure-retaining chamber associated with the outer face of the diaphragm and having a restricted communication with the first-mentioned chamber, a valve for controlling outflow from the last-mentioned chamber, and means for automatically opening and closing said last-mentioned valve.

8. In combination with apparatus of the character specified in claim 7, means for maintaining a constant pilot light independent of conditions within the first-mentioned chamber, a main burner supplied from the outlet of the first-mentioned chamber, a second normally-closed valve arranged to control outflow from the pressure-retaining chamber beyond the first-mentioned valve controlling said outflow, and thermostatic means within the heat influence of the pilot burner for controlling said last-mentioned valve.

9. In combination with apparatus of the character specified in claim 7, means for maintaining a constant pilot light independent of conditions within the first-mentioned chamber, said means embodying a pressure regulator, the main burner supplied from the outlet of the first-mentioned chamber, a second normally-closed valve arranged to control outflow from the pressure-retaining chamber beyond the first-mentioned valve controlling said outflow, and thermostatic means within the heat influence of the pilot burner for controlling said last-mentioned valve.

In witness whereof, I have hereunto set my hand at Wabash, Indiana, this 9th day of December, A. D. one thousand nine hundred and twenty-nine.

PAUL F. SHIVERS.